(12) United States Patent
Wright

(10) Patent No.: US 9,807,043 B2
(45) Date of Patent: *Oct. 31, 2017

(54) FORWARDING SELECTED DOCUMENT PASSAGES FROM AN ELECTRONIC READER

(71) Applicant: AT&T INTELLECTUAL PROPERTY I, L.P., Atlanta, GA (US)

(72) Inventor: Steven Wright, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,510

(22) Filed: May 26, 2016

(65) Prior Publication Data

US 2016/0277331 A1 Sep. 22, 2016

Related U.S. Application Data

(63) Continuation of application No. 14/878,279, filed on Oct. 8, 2015, now Pat. No. 9,374,336, which is a continuation of application No. 12/565,805, filed on Sep. 24, 2009, now Pat. No. 9,183,191.

(51) Int. Cl.
*H04L 12/58* (2006.01)
*G06F 3/0482* (2013.01)
*G06F 17/24* (2006.01)
*G09G 3/00* (2006.01)

(52) U.S. Cl.
CPC ............ *H04L 51/08* (2013.01); *G06F 3/0482* (2013.01); *G06F 17/241* (2013.01); *G09G 3/001* (2013.01); *H04L 51/38* (2013.01); *G09G 2380/14* (2013.01)

(58) Field of Classification Search
CPC ....... H04L 51/08; H04L 51/38; G06F 3/0482; G06F 17/241; G09G 3/001; G09G 2380/14
See application file for complete search history.

(56) References Cited

U.S. PATENT DOCUMENTS 7,103,848 B2 * 9/2006 Barsness ........... G06F 17/30716
715/776
7,200,808 B1 4/2007 Nagao
(Continued)

OTHER PUBLICATIONS

Microsoft, Troubleshoot copying and pasting with the Office Clipboard, 2003, http://office.microsoft.com/en-us/excel-help/troubleshoot-copying-and-pasting-with-the-office-clipboard-HP005254899.aspx.

*Primary Examiner* — Joe Chacko
(74) *Attorney, Agent, or Firm* — Greenblum & Bernstein, P.L.C.

(57) ABSTRACT

A method of forwarding selected passages from an electronic document being displayed on an electronic reader to a designated recipient. The method includes electronically selecting a passage from the electronic document, and automatically associating metadata with a selected passage upon selection by the user. The method also includes storing the selected passage together with the associated metadata in a file in the memory of the electronic reader. The method further includes electronically checking the selected passage for compliance with special requirements. The method also includes electronically transmitting the stored selected passage and associated metadata from the electronic reader.

20 Claims, 4 Drawing Sheets

(56) References Cited

U.S. PATENT DOCUMENTS

| | | | |
|---|---|---|---|
| 8,832,584 B1* | 9/2014 | Agarwal | G06F 3/0483 715/776 |
| 2005/0154760 A1* | 7/2005 | Bhakt | G06F 17/2229 |
| 2006/0282778 A1 | 12/2006 | Barsness et al. | |
| 2008/0154907 A1 | 6/2008 | Prasad et al. | |
| 2009/0217343 A1 | 8/2009 | Bellwood et al. | |
| 2011/0029443 A1 | 2/2011 | King et al. | |

* cited by examiner

FORWARDING SELECTED DOCUMENT PASSAGES FROM AN ELECTRONIC READER

CROSS REFERENCE TO RELATED APPLICATIONS

The present application is a continuation of U.S. patent application Ser. No. 14/878,279, filed Oct. 8, 2015, which is a continuation of U.S. patent application Ser. No. 12/565,805, filed on Sep. 24, 2009 now U.S. Pat. No. 9,183,191 issued Nov. 10, 2015. The disclosure of this document, including the specification, drawings, and claims, is incorporated herein by reference in its entirety.

BACKGROUND

1. Field of the Disclosure

The present disclosure relates to the fields of communications and electronic readers. More particularly, the present disclosure relates to a method of forwarding selected passages from an electronic document being displayed on an electronic reader, where the electronic document has been previously downloaded into the electronic reader by a content provided over a communication network. The selected passages are electronically transmitted from the electronic reader over the communications network to a designated recipient.

2. Background Information

Recently, electronic readers have been developed that display electronic documents for reading by a user. Such electronic documents include all types of documents, including books, magazines, newspapers, and other prepared documents. Electronic readers together with electronic documents provide a convenient replacement for traditional documents in paper or book form.

DESCRIPTION DETAILED

Figure 1:
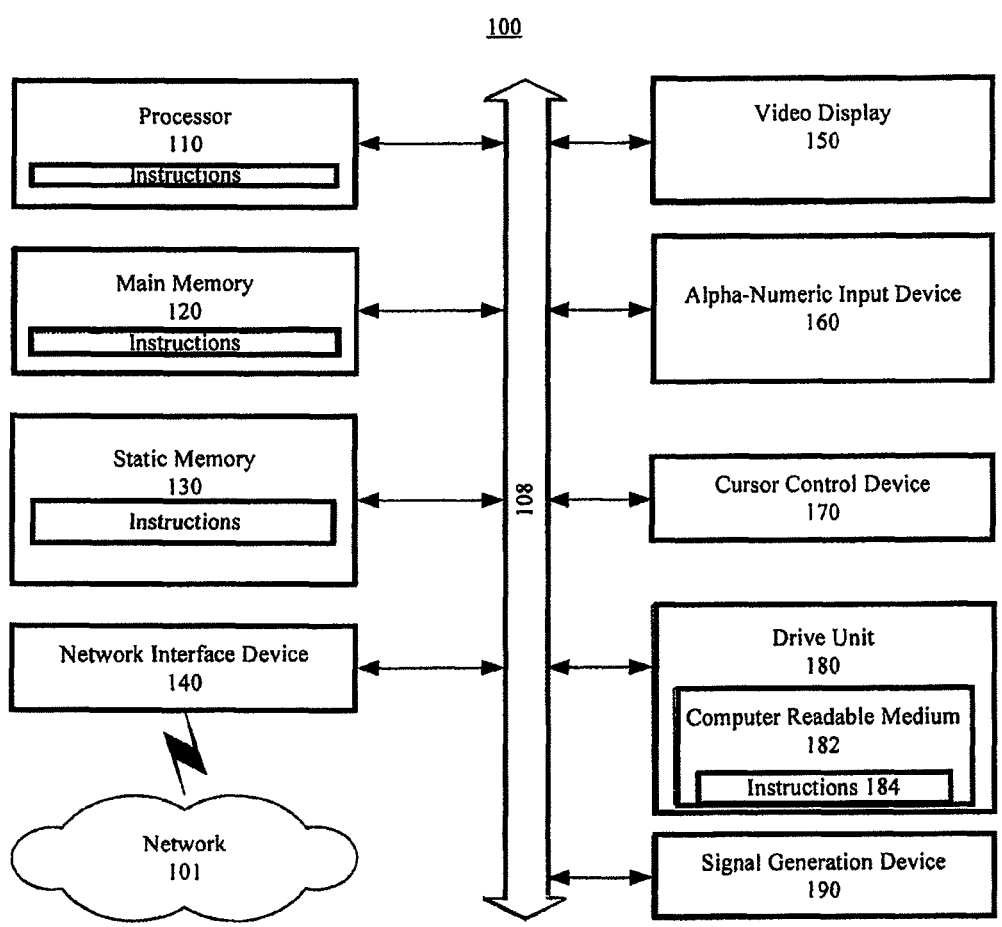
FIG. 1 shows an exemplary general computer system that includes a set of instructions for an electronic reader.

In view of the foregoing, the present disclosure, through one or more of its various aspects, embodiments and/or specific features or sub-components, is thus intended to bring out one or more of the advantages as specifically noted below.

According to an embodiment of the present disclosure, a method is provided for forwarding selected passages from an electronic document being displayed on a portable electronic reader. The method displays the electronic document on a display of the electronic reader, where the electronic document has been previously downloaded into a memory of the electronic reader over a communication network. A user of the electronic reader electronically identifies a passage from the displayed electronic document being displayed on the electronic reader, and electronically selects the identified passage from the electronic document. The method automatically associates metadata with the selected passage, where the metadata includes citation information identifying the displayed electronic document as a source document, and identifies the exact location of the selected passage in the source document. The selected passage is stored together with the associated metadata in the memory of the electronic reader. The stored selected passage and associated metadata are electronically transmitted from the electronic reader to a service provider over the communications network. The selected passage and associated metadata are subsequently electronically transmitted from the service provider to a designated recipient of the selected passage and associated metadata.

In another embodiment, the electronic reader electronically checks the selected passage for compliance with special requirements stored in the memory of the electronic reader, and notifies the user of the electronic reader of whether the selected passage is in compliance with the special requirements.

in a further embodiment, the method prevents the electronic transmission of the selected passage and the associated metadata from the electronic reader, when the selected passage is not in compliance with the special requirements. Additionally, the method permits the electronic transmission of the selected passage and the associated metadata from the electronic reader, when the selected passage is in compliance with the special requirements.

In an embodiment, the special requirements include permissible copyright fair use limitations, when the displayed electronic document is protected by copyright.

In another embodiment, the special requirements include permissible digital rights management limitations.

In a further embodiment, the special requirements include the size of the selected passage.

In an embodiment, the special requirements include the cumulative size of a plurality of selected passages from the displayed electronic document.

In another embodiment, the metadata further includes at least one note added by the user of the electronic reader.

In a further embodiment, the electronic reader records in the memory of the electronic reader, an historical log of selected passages from each electronic document, the historical log including the metadata and the date that each passage was selected.

In an embodiment, the service provider stores historical records associated with electronic documents downloaded to the electronic reader, the historical records being electronically accessible to the user of the electronic reader. In this embodiment, the historical records include an historical log of the passages and associated metadata that have been electronically transmitted from the electronic reader to the service provider over the communication network.

In another embodiment, the electronic transmission of the selected passage and associated metadata from the electronic reader to the service provider is conducted using a wireless communications network.

In a further embodiment, the electronic transmission of the selected passage and associated metadata from the service provider to the designated recipient is communicated by electronic mail.

In an embodiment, the designated recipient of the selected passage and associated metadata is restricted to an owner of the electronic reader who is registered as the owner of the electronic reader with the service provider.

In another embodiment, the designated recipient of the selected passage and associated metadata is restricted to the user of the electronic reader, who is registered as the owner of the electronic document by the content provider of the electronic document.

In a further embodiment, the selected passage and associated metadata is encrypted prior to being electronically transmitted to the service provider.

In an embodiment, the selected passage and associated metadata is downloaded directly from the electronic reader to a memory, external to the electronic reader, that is in electronic communication with the electronic reader.

In another embodiment, the selected passage includes at least one of formatted text, plain text, graphics presentation media, audio presentation media, and video presentation media.

In a further embodiment, the electronic document being displayed is stored on an Internet web site and is being displayed to the user of the electronic reader through a web browser.

In an embodiment, a tangible computer readable medium encoded with an executable computer program for forwarding selected passages from an electronic document being displayed on a portable electronic reader. In this embodiment, the executable computer program includes a display segment that displays an electronic document on a display of the electronic reader, the electronic document having been previously downloaded into a memory of the electronic reader. The executable computer program also includes an identification segment that electronically identifies, by a user of the electronic reader, at least one passage from the electronic document being displayed. The executable computer program further includes a selecting segment that electronically selects, by the user of the electronic reader, the at least one identified passage from the electronic document. Additionally, the executable computer program includes an associating segment that automatically associates metadata with the at least one selected passage, the metadata including citation information, and a storing segment that electronically stores the at least one identified passage together with the associated metadata in the memory of the electronic reader. In this embodiment, the at least one selected passage and associated metadata are electronically transmitted from the electronic reader to a designated recipient of the selected passage over the communication network.

In a further embodiment, a portable electronic reader for displaying an electronic document to a user of the electronic reader includes a memory for storing the electronic document, which has been previously downloaded to the memory by a content provider over a wireless communication network, and for storing a plurality of selected passages from the electronic document together with associated metadata, where the metadata includes citation information. The portable electronic reader also includes an input mechanism that enables the user to select the plurality of passages from the electronic document. The portable electronic reader further includes a presentation interface that interfaces the electronic document to the user of the electronic reader, the presentation interface providing at least one of a visual, audio or Braille interface. In this embodiment, a receiver is included in the portable electronic reader for receiving the electronic document from the content provider over the wireless communication network. A transmitter is also included that transmits the plurality of selected passages and associated metadata to an intended recipient through the wireless communication network. The portable electronic reader further includes a controller, wherein the controller controls all operations of the electronic reader, including automatically associating the metadata with each of the plurality of selected passages prior to the storage of the selected passages in the memory.

FIG. 1 is an illustrative embodiment of a general computer system, on which a method to select designated passages from an electronic documents on an electronic reader can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as an electronic reader, a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, a projection display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
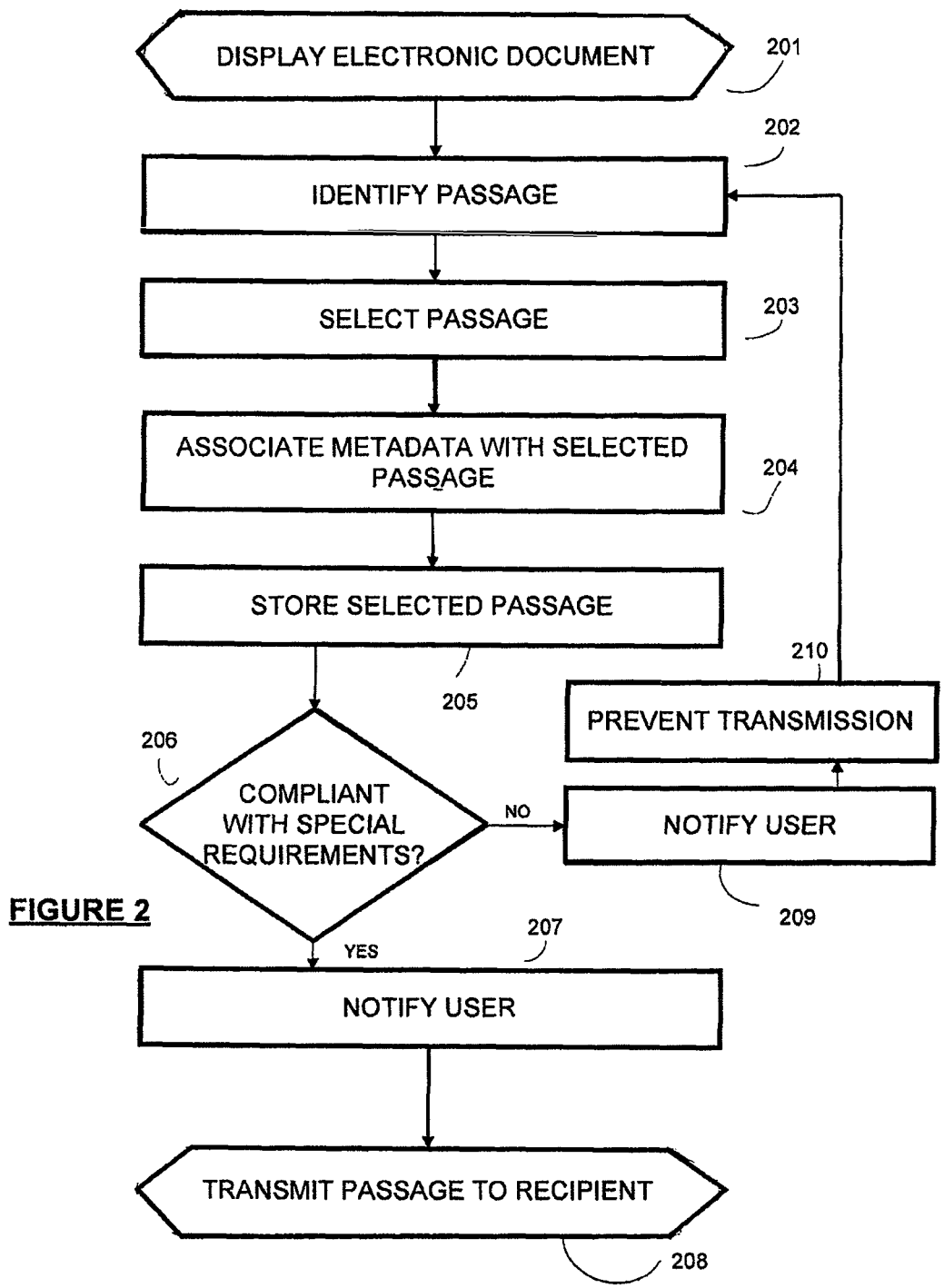
FIG. 2 is a flowchart depicting an exemplary process for forwarding selected passages from the electronic reader, according to an aspect of the present disclosure.

FIG. 2 is a flowchart depicting an exemplary process for forwarding selected passages from an electronic document being displayed on a presentation interface of an electronic reader. In the flowchart the method starts with an electronic document being displayed 201 on a presentation interface to a user of the electronic reader. This interface may be one of a several different types of presentation interfaces, such as a visual display, an audio display, a Braille interface, or any other interface that interfaces with the user of the electronic reader.

The user must then indentify a passage 202 contained in the displayed electronic document. The identification is performed by any one of a number of possible input mechanisms, such as a keyboard, stylus, touch sensitive display, etc. Although the flowchart only shows the identification of a single passage, more than one passage may be selected, if desired by the user.

The identified passage is then selected 203 by the user of the electronic reader. At this point, the user is not limited to selecting a single passage, but may select a plurality of passages, if desired. The selection is also performed by one of a number of possible input mechanisms, such as those mentioned previously. The selected passage may be text, audio, or video. Additionally, the selected passage may be all or a portion of the material being presented to the user, such as a text sentence, an audio clip, or a video frame.

After the passage is selected by the user, a controller within the electronic reader automatically associates metadata with the selected passage 204. The metadata preferably includes citation information identifying the displayed document as a source document, where citation information includes the source document title, author, publisher, date of publication, and ISPN number. Additionally, the citation information may include identifying the exact location of the selected passage in the source document. The metadata may also include additional data that was entered by the user of the electronic reader while reading the electronic document. For instance, such additional data may include a note or comment relevant to all identified and selected passage that was entered by the user for later reference. The additional data may include several notes or comments for a single passage as well. The additional notes or comments may be entered into the electronic reader either by the use of the input mechanism such as a keyboard or stylus, or may be entered audibly by the user of the electronic reader. Furthermore, the metadata may include the location of the device when the passage was selected. the metadata may include the identification of the type of document from which the passage is selected, such as whether the source document is a text, audio, or video document.

After the metadata has been associated with the selected passage, the selected passage together with the associated metadata is stored in a memory of the electronic reader 205. Generally, selected passages and associated metadata from a single source document are stored together in a file identifying the source document. The storing of the selected passages and the associated metadata in this manner permits the user of the electronic reader to retrieve, review, and edit the user entered metadata associated with a selected passage. The user can edit the desired metadata by either using the input mechanism, if desired. The input mechanism for editing would include the use of a keyboard, stylus, or microphone to audibly edit the user entered audible metadata.

After the selected passage and associated metadata are stored in the memory of the electronic reader, the electronic reader electronically checks the selected passage for compliance with any special requirements 206 that have been established in the electronic reader. The special requirements are also stored in the memory of the electronic reader. The electronic checking may be initiated automatically by the electronic reader upon the storing of the selected passage and associated metadata in the memory, or may be user initiated at any time during the process after the passage has been identified. The controller of the electronic reader may check for a particular special requirement, or for several special requirements, depending upon the particular settings that the user previously entered into the electronic reader. Such settings may be changed at any time by the user of the electronic reader.

The special requirements may include checking to see is permissible copyright fair use limitations have been exceeded. Additionally, another special requirement may include checking whether permissible digital rights management limitations have been exceeded. Such special requirements may further included checking the size of a selected passage to determine if the selected passage exceeds a particular predetermined size, where the predetermined size may be associated with established criteria, or selected by the user. The special requirements may also include the cumulative size of a plurality of selected passages from the same electronic source document. Again, the predetermined cumulative size may be associated with established criteria, or selected by the user. In another embodiment, the controller of the electronic reader may also check the metadata associated with a selected passage for compliance with one or more special requirements, similar to the special requirements discussed above.

If the controller of the electronic reader determines that the selected passage is in compliance with the special requirements, then the controller notifies the user 207 that the selected passage is in compliance with the special requirements. This notification may be performed in any of a number of ways, such as visually or audibly.

At this point, the controller enables the electronic transmission of the selected passage and associated metadata to a designated recipient 208. The electronic transmission may be performed automatically, or may be performed upon an instruction to do so entered into the electronic reader by the user. The electronic transmission may be performed wirelessly, or while directly connected to an external device. Additionally, the electronic transmission my be may directly to an electronic device of the designated recipient, or may be sent to a service provider over the communications network. Then, the service provider transmits the selected passage and associated metadata to the designated recipient, such as by using electronic mail.

Alternatively, when the controller determines that the selected passage is not in compliance with the special requirements, the controller notifies the user 209 that the selected passage is not in compliance with the special requirements. This notification may be performed in any of a number of ways, such as visually or audibly.

At this point, the controller prevents the electronic transmission 210 of the selected passage and associated metadata from the electronic reader when the selected passage is not in compliance with the special requirements. After receiving the notification that the selected passage is in non-compliance with the special requirements, the user may delete the non-compliant passage from the memory. The user may also return the identified passage in the electronic source document and re-select another passage that is in compliance with the special requirements. In this regard, the electronic reader may be configured in a number of ways. For instance, the electronic reader could automatically display the non-complying selected passage in the source document to the user so that the user can modify the identification of the selected passage. Alternatively, the electronic reader could permit the user to manually input an instruction to display the non-complying passage in the source document. These settings may also be implemented by the user setting an automatic or manual mode.

Other embodiments of the electronic reader may include where the electronic reader records in the memory, an historical log of selected passages from each source document. The historical log would include the metadata associated with each selected passage, and could also include the date that each passage was selected and stored.

In a different embodiment, a service provider could provide historical records associated with electronic documents downloaded to the electronic reader, as well as an historical log of the passages and associated metadata that have been electronically transmitted from the electronic reader to the service provider over the communications network. These historical records provided by the service provider could be accessible to the user of the electronic reader, either from the electronic reader, or from another electronic device over the communications network.

Another embodiment would place restrictions on which designated recipient could receive the transmitted selected passage and associated metadata. For instance, the designated recipient could be restricted to the owner of the electronic reader who is registered as the owner of the electronic reader with the content provided of the electronic document. The designated recipient could also be restricted to a user of the electronic reader who is registered as the owner of the electronic source document by the content provider of the electronic document. The designated recipients could also be restricted to recipients specially designated by the owner of the electronic reader.

In a further embodiment, the selected passage and associated metadata may be encrypted by the electronic reader. The encryption would be performed prior to the selected passage and associated metadata being electronically transmitted from the electronic reader. The encryption may also include encoding using Extensible Markup Language (XML).

The selected passage and associated metadata may be downloaded directly from the electronic reader to a memory external to the electronic reader. The direct downloading may be performed wirelessly. The selected passage may include one or more of a variety of media. For instance, the selected passage may include formatted text, plain text, graphics presentation media, audio presentation media, and/or video presentation media In an embodiment, the electronic document being displayed may be stored on an Internet web site and displayed to the user of the electronic reader through a web browser. The selected passages and associated metadata may be stored in the memory of the electronic reader or at a location designated by the provider of the Internet web site.

The various features illustrated in FIG. 2 are exemplary in nature. Applicants process is not limited to the particular content of the illustrated process features, or the order of the various process features depicted in FIG. 2.

Figure 3:
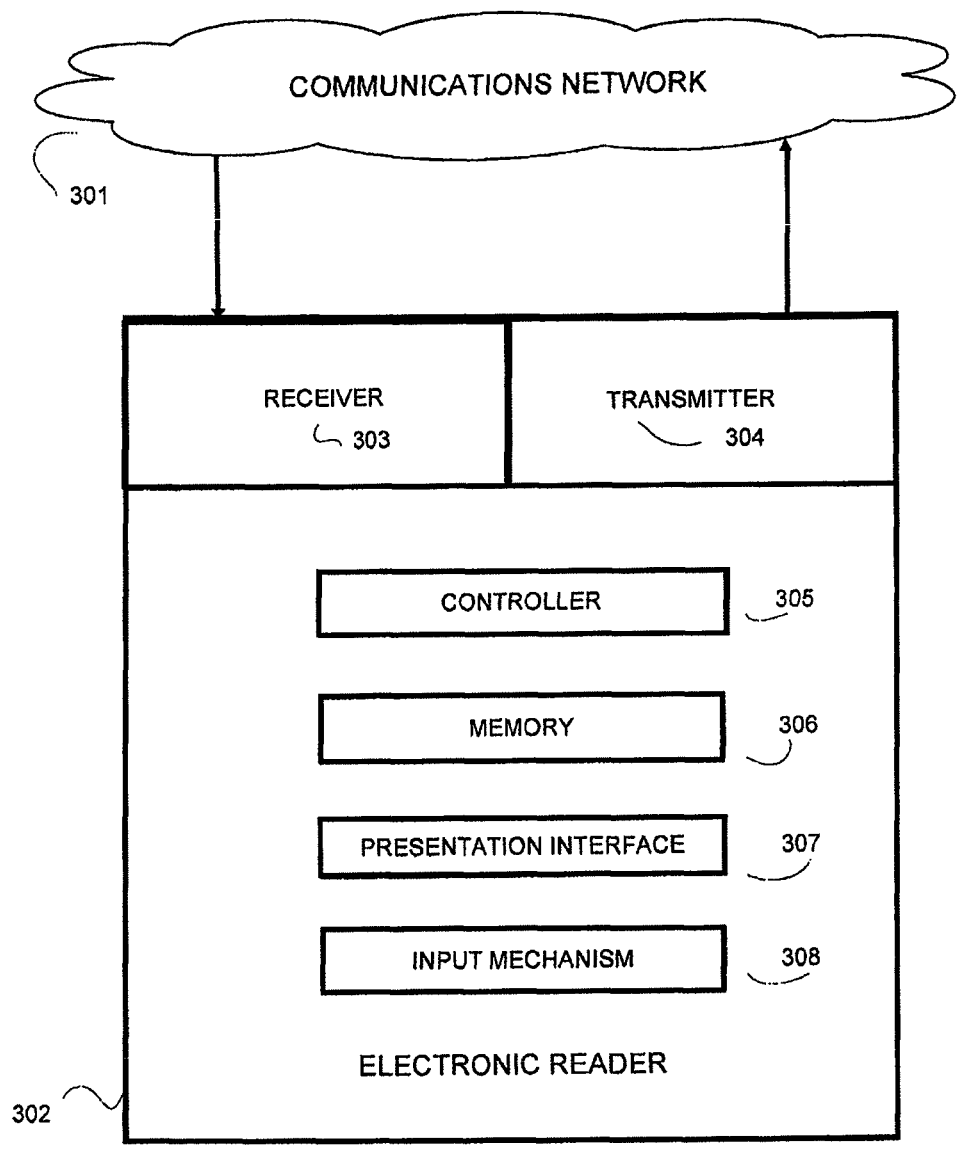
FIG. 3 shows an exemplary block diagram of an embodiment of the electronic reader, according to an aspect of the present disclosure.

FIG. 3 shows an exemplary block diagram of an embodiment of the electronic reader 302. The electronic reader 302 receives electronic documents downloaded over a communications network 301. The electronic reader 302 includes a receiver 303 for receiving communications over the communications network, including receiving downloaded electronic documents. The electronic reader 302 also includes a controller 305 that controls all operations of the electronic reader, as well as a memory 306 for storing the downloaded electronic documents, selected passages and associated metadata. Also included in the electronic reader 302 are a presentation interface 307 and an input mechanism 308. A transmitter 304 is also provided for transmitting communications from the electronic reader 302 over the communications network 301.

Figure 4:
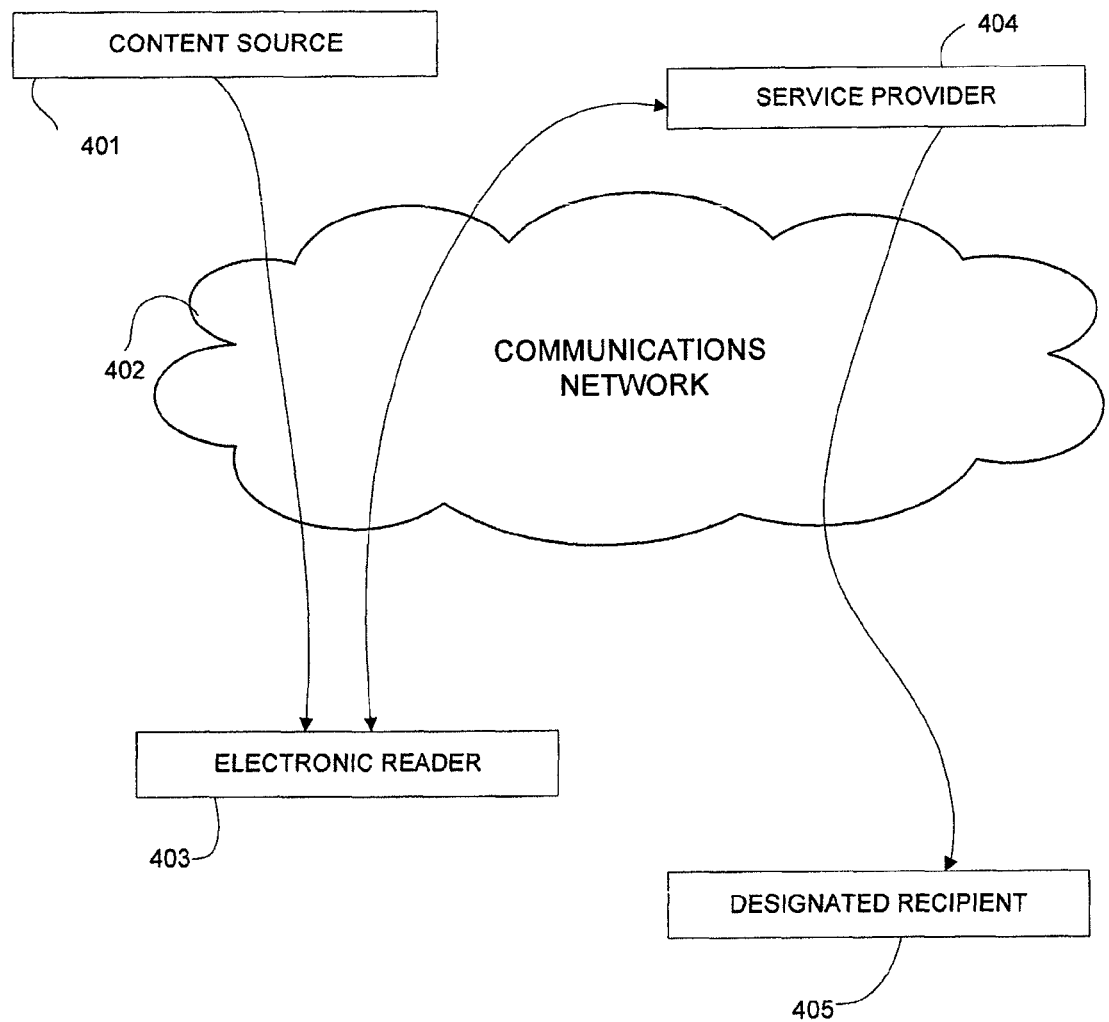
FIG. 4 represents an exemplary logical illustration of the flow of data within the overall system.

FIG. 4 represents an exemplary illustration of the logical flow of data within the overall system. Initially, an electronic document is downloaded from a content source 401 into the electronic reader 403. The downloading of the electronic document may be conducted over a communications network 402, which may take one of many alternative forms. After a user has selected one or more passages from the electronic document, the selected passages and associated metadata may be transmitted from the electronic reader 403 over the communications network 402 to a service provider 404. Additionally, various forms of bidirectional communication relating to the operation and content of the electronic reader may be conducted between the electronic reader 403 and the service provider 404. Further, based upon instructions from the user of the electronic reader 403, the service provider 404 may further transmit information, such as the selected passages and associated metadata, to a designated recipient 405. This further transmission of information may take many forms, such as by electronic mail having attachments, and may be transmitted to a plurality of designated recipients.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (e.g., VoIP, Internet Protocol) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of forwarding selected passages from an electronic document being displayed on an electronic reader, comprising:
   electronically selecting a passage from the electronic document;
   automatically associating metadata with a selected passage, the metadata including citation information identifying the displayed electronic document as a source document and identifying a location of the selected passage in the source document;
   storing the selected passage together with the associated metadata in a file created in a memory of the electronic reader;
   electronically checking, by a controller in the electronic reader, the selected passage stored in the memory of the electronic reader for compliance with special requirements stored in the memory of the electronic reader prior to the selected passage being transmitted over a communication network; and
   electronically transmitting the stored selected passage and associated metadata from the electronic reader over the communications network,
   wherein the electronically checking may be selectively performed automatically by the electronic reader, and may be selectively performed by manual initiation.

2. The method of claim 1, further comprising:
   providing a notification by the electronic reader whether the selected passage is in compliance with the special requirements.

3. The method of claim 1, further comprising:
   preventing electronic transmission of the selected passage and the associated metadata from the electronic reader when the selected passage is not in compliance with the special requirements; and permitting the electronic transmission of the selected passage and the associated metadata from the electronic reader when the selected passage is in compliance with the special requirements.

4. The method of claim 1, wherein the special requirements include copyright limitations, when the displayed electronic document is protected by copyright.

5. The method of claim 1, wherein the special requirements include digital rights management limitations.

6. The method of claim 1, wherein the special requirements includes a designated number of words.

7. The method of claim 1, wherein the special requirements include a cumulative size of a plurality of selected passages from the displayed electronic document.

8. The method of claim 1, wherein the metadata further includes at least one added note.

9. The method of claim 1, wherein the electronic reader records in the memory of the electronic reader an historical log of selected passages from each electronic document, the historical log including the metadata and the date that each passage was selected.

10. The method of claim 1, wherein a service provider stores historical records associated with electronic documents downloaded to the electronic reader, the historical records being electronically accessible, wherein the historical records include an historical log of the passages and associated metadata that have been electronically transmitted from the electronic reader over the communication network.

11. The method of claim 1, wherein the electronic transmission of the selected passage and associated metadata from the electronic reader is conducted using a wireless communications network.

12. The method of claim 11, wherein the electronic transmission of the selected passage and associated metadata to the designated recipient is communicated by electronic mail.

13. The method of claim 1, wherein a designated recipient of the selected passage and associated metadata is restricted by the electronic reader.

14. The method of claim 13, wherein the designated recipient of the selected passage and associated metadata is restricted to a person who is registered as an owner of the electronic document by a content provider of the electronic document.

15. The method of claim 1, wherein the selected passage and associated metadata is encrypted prior to being electronically transmitted.

16. The method of claim 1, wherein the selected passage and associated metadata is downloaded directly from the electronic reader to a memory, external to the electronic reader, that is in electronic communication with the electronic reader.

17. The method of claim 1, wherein the selected passage includes formatted text, plain text, graphics presentation media, audio presentation media, or video presentation media.

18. The method of claim 1, wherein the electronic document being displayed is stored on an Internet web site and is being displayed on the electronic reader through a web browser.

19. A non-transitory computer-readable storage medium encoded with an executable computer program for forwarding selected passages from an electronic document being displayed on an electronic reader, and that when executed by a processor, causes the processor to perform operations comprising:
    selecting an identified passage from the electronic document;
    automatically associating metadata with the selected passage upon selection, the metadata including citation information;
    storing the identified passage together with the associated metadata in a file created in the memory of the electronic reader; and
    electronically checking, by a controller in the electronic reader, the selected passage stored in the memory of the electronic reader for compliance with special requirements stored in the memory of the electronic reader prior to the selected passage being transmitted over a communication network,
    wherein the selected passage and associated metadata are electronically transmitted from the electronic reader over the communication network, and
    wherein the electronically checking may be selectively performed automatically by the electronic reader, and may be selectively performed by manual initiation.

20. An electronic reader for displaying an electronic document to a user of the electronic reader, the electronic reader comprising:
    a memory for storing the electronic document, and for storing a plurality of selected passages from the electronic document together with associated metadata, the metadata including citation information;
    an input mechanism that enables selection of the plurality of selected passages from the electronic document;
    a presentation interface provides a visual display of the electronic document;
    a receiver for receiving the electronic document from the content provider over a communication network;
    a controller, wherein the controller controls operations of the electronic reader including automatically associating the metadata with each of the plurality of selected passages upon selection by the user, electronically checking the plurality of selected passages stored in the memory for compliance with special requirements stored in the memory prior to the selected passage being transmitted over the communication network, and storing the plurality of selected passages in a file created in the memory; and
    a transmitter that transmits the plurality of selected passages and associated metadata over the communication network,
    wherein the electronically checking may be selectively performed automatically by the electronic reader, and may be selectively performed by manual initiation.

* * * * *